F. W. WOOD.
ART OF INDICATING SPEEDS OF ROTATION.
APPLICATION FILED DEC. 20, 1918.
1,364,673.
Patented Jan. 4, 1921.
2 SHEETS—SHEET 1.
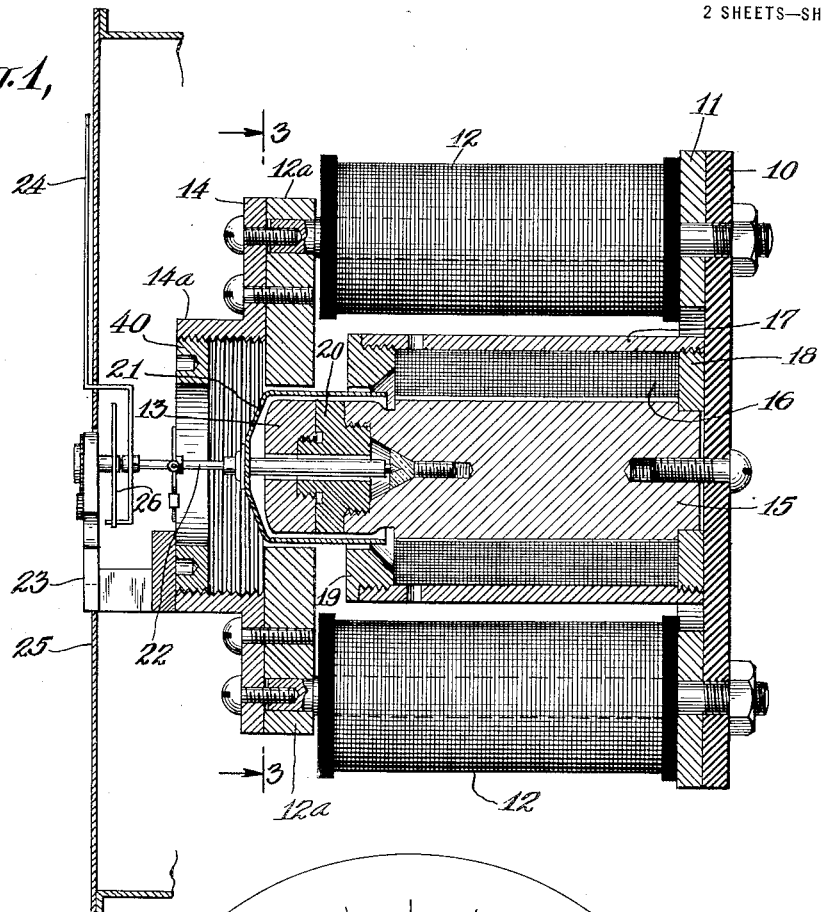
Fig.1,
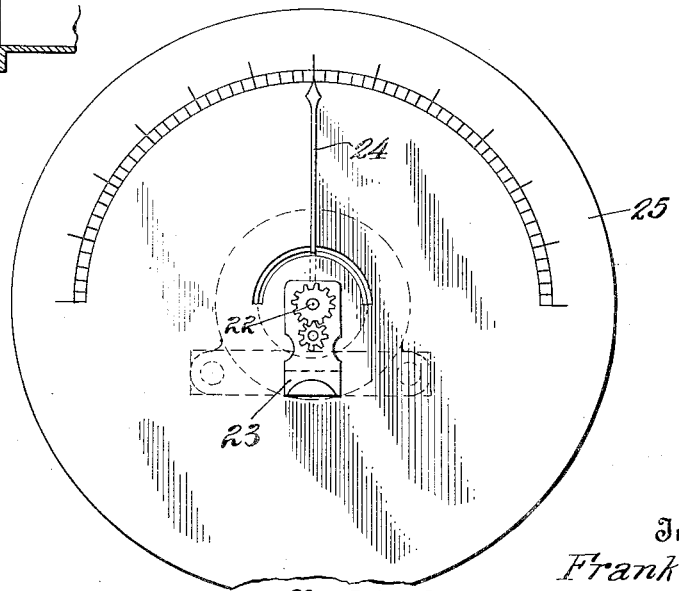
Fig.2,
Inventor
Frank W. Wood
By his Attorneys
Meyers, Cushman & Rea.

F. W. WOOD.
ART OF INDICATING SPEEDS OF ROTATION.
APPLICATION FILED DEC. 20, 1918.
1,364,673.
Patented Jan. 4, 1921.
2 SHEETS—SHEET 2.
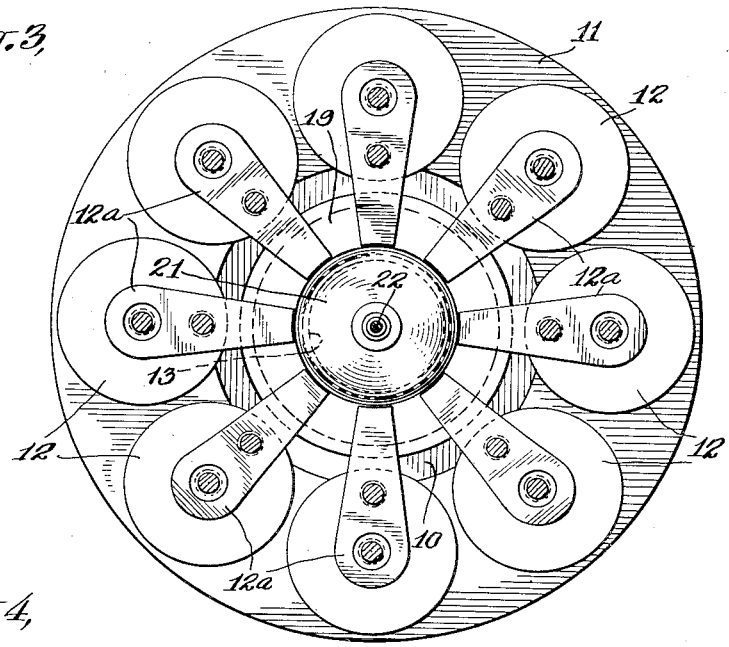
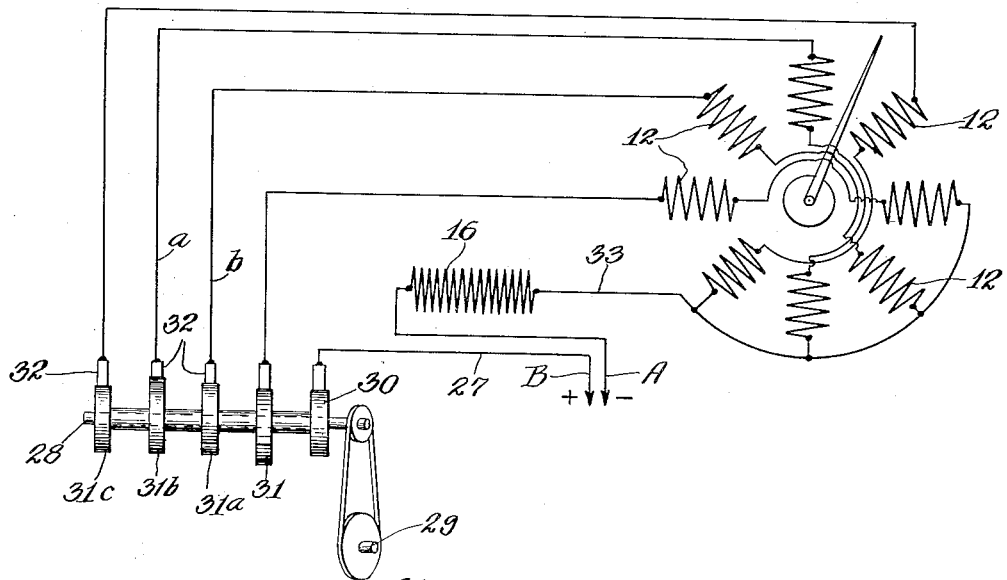
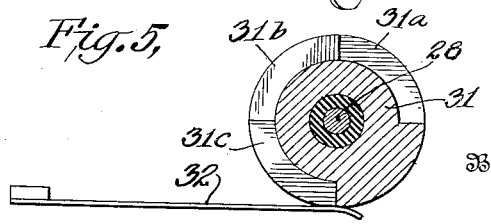
Inventor
Frank W. Wood
By his Attorneys
Meyers, Cushman & Rea

UNITED STATES PATENT OFFICE.

FRANK W. WOOD, OF MONTCLAIR, NEW JERSEY.

ART OF INDICATING SPEEDS OF ROTATION.

1,364,673.  Specification of Letters Patent.  Patented Jan. 4, 1921.

Application filed December 20, 1918. Serial No. 267,681.

*To all whom it may concern:*

Be it known that I, FRANK W. WOOD, a citizen of the United States, residing at Montclair, in the county of Essex and State of New Jersey, have invented new and useful Improvements in the Art of Indicating Speeds of Rotation, of which the following is a specification.

This invention relates to the art of indicating speeds of rotation, pertaining more particularly to that type of such inventions wherein the indicator movements are provided by the activity of magnetic circuits.

Various methods have been employed to give visual indication of the speed at which drive or driven elements are rotated, these, however, being more or less complicated in character or cumbersome in structure. And while some of these methods involve the use of electrical apparatus, and, like the embodiment of apparatus herein disclosed, provide for movements of an indication pointer relative to a calibrated scale, such apparatus is also of the complicated, cumbersome and expensive type.

The present invention is designed to overcome these objectionable features by utilizing certain general effects present in magnetic circuit operations, and by so combining the resultant effects of rendering these circuits active in a cyclic operation on a movable element of the indicator, the methods are greatly simplified. In addition, substantial accuracy of indication is provided by control of element movements, in such manner as to render the structure sufficiently sensitive to speed changes as to produce a close approximation to true speeds without, however, being unduly affected by minor speed changes.

Another object is to provide a construction operating under these general methods, and in which the construction is simple and compact, able to withstand the difficulties of service conditions, operative under low cost conditions, and comparatively inexpensive in manufacture and installation.

To these and other ends, the nature of which will be readily understood as the invention is hereinafter disclosed, said invention consists in the improved methods, and apparatus for carrying the same into effect, hereinafter fully described, illustrated in the accompanying drawings, and more particularly pointed out in the appended claims.

In the accompanying drawings, in which similar reference characters indicate similar parts in each of the views:

Figure 1 is a sectional view taken vertically through one embodiment of apparatus which may be employed.

Fig. 2 is a face view of the same.

Fig. 3 is a sectional view taken on line 3—3 of Fig. 1.

Fig. 4 is a diagrammatic view showing the electrical wiring employed in the particular apparatus shown, and also showing one way in which the circuits may be made and broken by the operation of the element the speed of rotation of which is to be indicated.

Fig. 5 is a detail sectional view showing one form of circuit make and break structure which may be employed.

In illustrating the general principles of the present invention, I have utilized one embodiment employed for indicating the speed of rotation of an engine shaft, this particular embodiment being one of several ways in which the principles may be utilized and will therefore be explanatory of the principles involved. The invention is not, however, limited either as to structure or use, to this particular form and it is to be understood that the disclosure in this respect is simply illustrative.

Referring first to the disclosure of Figs. 1, 2 and 3, 10 indicates a base, which may be of insulating material, if desired, carrying a ring-like member 11, the latter being interposed between the base and the inner ends of a plurality of electro-magnets 12, the latter being arranged in spaced-apart relation in a circular formation, the magnets, ring and base being secured together in suitable manner, the drawings showing the connection provided by extending the inner ends of the magnet cores beyond the ends of the magnets, the extensions extending through the ring and base and being threaded to receive securing nuts.

In the particular embodiment shown, eight magnets 12 are utilized, but it will be understood that the number may be varied to meet the particular conditions of use.

Secured to the advance end of each magnet core is a pole piece $12^a$, the several pole pieces each extending in a direction radial to a member—presently referred to—located on the general axis of the circular formation of magnets, the several pole-pieces thus presenting a general arrangement such as indicated in Fig. 3.

The outer ends of the magnet structures are rigidly connected by a ring-like member 14, preferably of non-magnetic material, this member carrying an outwardly-extending, internally-threaded flange 14ª for a purpose presently described.

Secured to base 10, and extending on said axis is a core member 15 of relatively large cross-section, this member carrying a coil 16, the latter being mounted between the core and a tubular member 17 mounted on a ring 18, at the inner end of the core, and an annular member 19 at the advance end of the core, the several parts providing a housing for coil 16.

As shown more particularly in Fig. 1, core 15 extends to a point in rear of the plane of pole-pieces 12ª, and has its forward end recessed to receive a portion of a member 20 which serves as a spacing member to separate member 13 from core 15, member 20 being shown as having a threaded connection to both member 13 and core 15, member 13 thus being supported in its axial position relative to the pole-pieces of magnets 12 by core 15 and spacing member 20.

Member 19 is positioned opposite to and spaced from the advance end of core 15, said member and the core having suitable cross-sectional configurations to produce the opposite pole faces of an annular magnetic field surrounding this end of core 15, it being understood that when coil 16 carries current a magnetic circuit will be set up extending from the annular pole of core 15, through the core ring 18, tubular member 17 and annular member 19 to the annular pole face of the latter member. It may be noted that this arrangement provides a convenient form of dampening coil or a structure providing a field of constant characteristics, this field being located in rear of and spaced from the fields provided by the magnetic circuits set up by magnets 12 and which extend through member 13 as presently described.

21 designates a movable element shown as in the form of a drum or cup-shaped member, said element being formed of suitable material—aluminum, for instance, and mounted on a spindle 22, the inner end of which is shown as suitably supported in the advance end of core 15—preferably mounted in a jeweled bearing—the outer end being mounted in a suitable bearing carried by a bridge member 23 secured to flange 14ª. Element 21 may be varied as to general configuration, the essentials being the presence of a ring-like portion—indicated by the skirt of the drum shown—and means to connect it to the spindle.

Spindle 22 carries a suitable indicating member 24, shown as a pointer, the latter being positioned to provide visual indications relative to a calibrated scale 25 suitably supported at the front of the structure.

As will be seen, scale 25 carries an indication corresponding to the position of the pointer when no speed reading is being had, as when the rotatable element is at rest. The automatic location of the pointer in this position is provided by suitable means, as for instance the use of a spring 26, one end of which is secured to spindle 22, the other end being carried by a stationary portion of the structure. The spring is preferably of the type employed in watches, etc., the movement of the spindle tending to wind or unwind the spring. Where the device is adapted to indicate speeds in both directions, the rest or neutral position of the pointer is at an intermediate point, and the spring will operate to locate the pointer in this position when the drum is not subject to the torque action presently referred to. In such case movement of the spindle in one direction will tend to wind the spring and movement in the other direction will tend to expand it—in either case, the spindle is placed under the restraint of the spring tension, the restraint value thus being of predetermined amount.

Obviously, two springs opposing each other may be employed, this being a well known equivalent in meeting this problem.

As shown in Fig. 4, magnets 12 are connected up in pairs, one magnet of the pair being directly opposite the other magnet of the pair, these magnets being connected in series and connected at one end to a circuit make and break device and at the other end to a return connection common to the several pairs, this connection indicated at 27 being shown as leading to one of the main lines—A—with coil 16 included in the line, thus placing the coil in series with the pairs of magnets.

The circuit make and break device is shown as in the form of a rotatable shaft 28 operatively connected to the rotatable element, the speed of which is being indicated, designated at 29, shaft 28 carrying a disk 30 operatively connected to the other side—B—of the main line through the usual brush contact, said shaft also carrying a number of contact segments corresponding in number to the number of pairs of magnets. The drawings indicate four pairs and consequently four contact segments, indicated at 31, 31ª, 31ᵇ and 31ᶜ are employed, each segment having an active angular length of 90 deg., the segments being positioned on the shaft at the proper points so that the several segments complete the 360 deg. angular distance. As shown in Fig. 5, the segments may be insulated from shaft 28, provision being made, however, to connect the segments electrically to disk 30.

Each pair of magnets is connected to a segment by a suitable contact brush, 32, shown as in the form of a spring, the latter being preferably arranged in such manner that while the angular length of the active face of a segment is 90 deg., such face becomes active slightly in advance of reaching the normal center line and remains active for a slight period after the face has passed such line. As a result the normal condition of having but one pair of magnets active in the completion of the magnetic field formation, is momentarily changed at the instant of transfer from one pair to the next, both pairs being active during this period.

From the above, it will be understood that assuming segment 31$^b$ to be in contact with its brush, an electrical circuit will be completed from line B to line A through disk 30, segment 31$^b$, lead $a$ to the upper and lower magnets of Fig. 3, connection 27, lead 33, coil 16 to line A. This circuit provides a magnetic circuit through the core of the upper magnet its pole-piece 12$^a$, member 13, pole piece of the lower magnet, the core of the latter and ring 11, drum 21 having its skirt located within the field or fields of this magnetic circuit.

Since coil 16 is constantly in circuit, the annular magnetic field provided by this coil will also be effective on the drum skirt which extends into this field.

As shaft 28 rotates, the active face of the succeeding segment (31$^a$ for instance) contacts with its brush and completes an additional electrical circuit through lead $b$ to the succeeding pair of magnets in an anti-clockwise direction, to connection 27 and thence as before setting up a second magnetic circuit through member 13, thus producing the effect of two magnetic circuits crossing member 13 on intersecting lines.

This double circuit activity is momentary only, the electrical circuit through segment 31$^b$ being broken through the active face of this segment leaving its brush, thus reducing the active magnetic circuits to one, this circuit, however, being angularly disposed to the first circuit.

The resultant action of this transfer operates to produce a torque action on drum 21 through the eddy current effects produced in the drum, with the result that the drum will be moved in a counter-clockwise direction against the tension effect of spring 26, thus moving the pointer toward the left.

As will be understood the angular length of drum movement will be determined by the value of the torque, the movement continuing until the torque effect balances the tension of spring 26. If the electrical circuit be broken at this time, the absence of the torque establishes preponderance of the spring tension and operates to return the drum and pointer to its initial position. It will be understood, however, that the general operation continues this successive shifting of the position of the active magnetic circuit—continuing the general cycle described throughout the magnet structure through rotation of shaft 28, the result being that with travel of this shaft at a uniform speed, the torque effect is practically the same with each change, so that the drum will be practically maintained in the same position through the balanced relation between the torque and spring tension, the action of the constantly active dampening coil 16 aiding in securing this result, so that the pointer will maintain substantially constant position relative to the scale.

If, however, the speed of rotation of shaft 28 increases, the changes will be effected more rapidly, thus changing the torque value to increase it—in accordance with well known laws—disturbing the balanced relation between torque and spring tension which is then restored by further advancing movement of the drum and a corresponding shifting of the pointer. Should the speed of shaft 28 be decreased, a slowing effect will be provided in the rate of change in the magnetic circuits, reducing the torque value, whereupon spring 26 becomes active in restoring the balance, drum 21 moving clockwise in this case and shifting the pointer correspondingly.

To regulate the apparatus, I employ an annular ring 40 adjustable in flange 14$^a$ toward and from pole-pieces 12$^a$, adjustment of this ring tending to vary the reluctance of the magnetic circuits with a resultant effect on the torque values.

Obviously, for a reversal in the direction of shaft rotation, the order of advance of the magnetic circuit progression is reversed, thus moving the drum angularly in the opposite direction.

From the above, it will be understood that I have produced a method of positioning the indicator and producing its position changes by rendering a plurality of magnetic fields active in a regular progression with the duration of field activity substantially equal in the several fields, subjecting a movable element of the indicator to the action of the field progression, and varying the position of the element by varying the rate of advance of such progression, uniformity in rate of advance serving to maintain the element in its position. This result is obtained by establishing electric circuits in a corresponding progression, the rate of change in these circuits effecting the variations in the magnetic circuits, so that while the indicator movements are the result of the magnetic circuit activity the control of advance is provided with electrical circuits enabling the use of a simple type of make and break device which may be located at any desired point regardless of the position of the visual indicator.

Obviously, the structure may be operated under low voltage or small current conditions, and since the general arrangement is of simple type, the structure provides an indicator of compact form, and relatively inexpensive as compared with the general form of indicators of this type.

Obviously, the number of pairs of magnets 12 employed may be varied to meet the exigencies of use, the circuit make and break device being varied accordingly. And while the general arrangement of utilizing the magnetic circuits singly and providing a change to multiple only at the instant of advance is preferred, it will be understood that this may also be varied, through change in the form of circuit make and break device.

While I have herein disclosed the general principles of my invention and have pointed out an embodiment for carrying them into effect, it will be understood that variations therein and changes and modifications in apparatus for carrying them into effect may be found necessary or desirable to meet the exigencies of use, and I reserve the right to make such variations, changes or modifications as may be found desirable or essential, in so far as the same may fall within the spirit and scope of the invention as expressed in the accompanying claims when broadly construed.

While I have referred to the field produced by the dampening coil structure as an annular field, it will be readily understood that the polar face of member 19 may be of the salient pole type, this effect being readily produced by recessing the polar face at spaced-apart points. The action produced varies from the continuous annular field in producing spaced fields instead of a continuous field. As the fields are active constantly the general effect is such as to make such structure, what may be considered as the substantial equivalent of the continuous field.

While I have not specifically described the structures in detail, it will be understood that for producing accurate balancing effects on the pointer, the spindle of the latter may carry any suitable balance adjustment mechanism; and if desired, suitable adjusting mechanism for locating the neutral position of the spring may be employed. Such structures are well known in the art and may be utilized if desired, the drawings illustrating such structures.

Having thus described my invention, what I claim as new is:

1. In the art of indicating speeds of rotation, wherein the indicator movements relative to a predetermined point are provided by rate changes in a definite cyclic operation, the method of positioning the indicator and producing its position changes which consists in rendering a plurality of magnetic fields active in a regular progression with the duration of field activity substantially equal in the several fields, subjecting a movable element of the indicator to the action of the field progression, and varying the position of the element by varying the rate of advance of such progression.

2. In the art of indicating speeds of rotation and wherein speed variations are effective in shifting the indicator, the method of positioning the indicator and producing its shifting movements which consists in establishing the successive activity of a plurality of magnetic circuits each active in the formation of a temporary field to produce a progression of temporary fields, subjecting a movable element of the indicator to the action of the field progression to position the element relative to a predetermined point, and varying the position of the element by varying the rate of advance of the field formation activity.

3. In the art of indicating speeds of rotation and wherein speed variations are effective in shifting the indicator, the method of positioning the indicator and producing its shifting movement which consists in establishing the successive activity of a plurality of magnetic circuits each active in the formation of a temporary field to produce a progression of temporary fields, subjecting a movable element of the indicator to the action of the field progression, maintaining the position of the element by maintaining constant the rate of advance of the field formation activity, and varying the position of the element by varying the rate of advance of such field formation activity.

4. In the art of indicating speeds of rotation and wherein the indicator movements relative to a predetermined point are provided by rate changes in a definite cyclic operation, the method of positioning the indicator and producing its position changes which consists in establishing the temporary activity of a plurality of electric circuits in a definite advancing progression to produce a similar progression of magnetic fields relative to an axis, subjecting a movable element of the indicator having an axis coincident with said field axis to the action of such field progression, and varying the position of the element by varying the rate of advance of such progression.

5. In the art of indicating speeds of rotation and wherein the indicator movements relative to a predetermined point are provided by rate changes in a definite cyclic operation, the method of positioning the indicator and producing its position changes which consists in individually establishing a succession of magnetic circuits in a definite advancing progression to produce a corresponding progression of fields relative to a predetermined point, and with the times of activity relatively arranged to produce activity of one field in advance of rendering the previous field of the progression inactive, subjecting a movable element of the indicator to the action of the field progression, and varying the position of the element by varying the rate of advance of such progression.

6. In the art of indicating speeds of rotation and wherein the indicator movements relative to a predetermined point are provided by rate changes in a definite cyclic operation, the method of positioning the indicator and producing its position changes which consists in subjecting a rotatable element of the indicator to the action of a progression of magnetic fields rendered active in a definite advancing order and with the element subject to a restraint against advancing movement, and varying the position of the element by varying the rate of advance of such progression.

7. In the art of indicating speeds of rotation and wherein the indicator movements relative to a predetermined point are provided by rate changes in a definite cyclic operation, the method of positioning the indicator and producing its position changes which consists in subjecting a rotatable element of the indicator structure to the resultant action of a progression of magnetic fields rendered active in a definite advancing order concurrently with the activity of a field of constant characteristics.

8. In the art of indicating speeds of rotation and wherein the indicator movements relative to a predetermined point are provided by rate changes in a definite cyclic operation, the method of positioning the indicator relative to such point and of producing its position changes which consists in rendering a plurality of magnetic fields active in a regular advancing progression by establishing a corresponding progression of magnetic circuits, regulating the position of the indicator relative to such point by regulating the reluctance of the several circuits, subjecting a movable element of the indicator to the action of the field progression, and varying the position of the element by varying the rate of advance of such progression.

9. In the art of indicating speeds of rotation and wherein the indicator movements relative to a predetermined point are provided by changes in rate of a definite cyclic operation, mechanism for positioning the indicator, said mechanism including a rotatable element operatively connected to the indicator, means for producing a rotating magnetic field passing through the rotating element, the construction being such that the rotation of the field tends to rotate said element, means whereby variations in the rate of rotation of the field will vary the position of the indicator, and means having a fixed magnetic field passing through the rotating element and operative to resist the rotation thereof so as to damp fluctuations due to changes in rate of rotation of the rotating field.

10. In the art of indicating speeds of rotation and wherein the indicator movements relative to a predetermined point are provided by rate changes in a definite cyclic operation, mechanism for positioning the indicator and for providing its changes in position, said mechanism including an element movable about an axis and operatively connected to the pointer, a plurality of field magnets positioned relatively to said element to establish magnetic circuits traversing said element during magnet activity, means for regulating the reluctance of the magnetic circuits, means for rendering said magnets active in a regular progression to position the pointer relative to such point, and means whereby variations in the rate of progression advance will vary the position of the pointer.

11. In the art of indicating speeds of rotation and wherein the indicator movements relative to a predetermined point are provided by rate changes in a definite cyclic operation, mechanism for positioning the indicator and for providing its changes in position, said mechanism including an element movable about an axis and operatively connected to the pointer, a plurality of field magnets positioned relatively to said element to establish magnetic circuits traversing said element during magnet activity, means for rendering said magnets active in a regular progression to position the pointer relative to such point, means for establishing a magnetic field additional to the fields of said circuits, said field being constant in activity relative to said element to subject the element continuously to the direct effect of each of said fields, and means whereby variations in the rate of progression advance will vary the position of the pointer.

12. In the art of indicating speeds of rotation and wherein the indicator movements relative to a predetermined point are provided by rate changes in a definite cyclic operation, mechanism for positioning the indicator and for providing its changes in position, said mechanism including an element movable about an axis and operatively connected to the pointer, a plurality of field magnets positioned relatively to said element to establish magnetic circuits traversing said element during magnet activity, means for rendering said magnets active in a regular progression to produce a corresponding progression of magnetic fields, said latter means being operative to produce activity of one field in advance of rendering a previous field of the progression inactive, and means whereby variations in the rate of progression advance will vary the position of the pointer.

13. An indicator comprising a support, a plurality of field magnets carried thereby having straight cores parallel to and symmetrically located about an axis, a spindle supported on said axis and carrying a ring-shaped element within the field zones of the magnets, an indicator operatively connected to the spindle, and means for rendering said magnets active in a regular advancing progression.

14. An indicator comprising a support, a plurality of field magnets carried thereby having straight cores parallel to and symmetrically located about an axis, a spindle supported on said axis and carrying a ring-shaped element within the field zones of the magnets, an indicator operatively connected to the spindle, means for rendering said magnets active in a regular advancing progression, and means for establishing a magnetic field of constant value and continuous activity relative to said element.

15. An indicator including a rotatable element, indicating mechanism operatively connected to said element, means for producing a rotating field about said element and tending to rotate the element, means whereby variations in the rate of rotation of the field will vary the position of the indicating mechanism, and means for varying the reluctance of the magnetic circuits comprising the rotating element.

16. An indicator comprising a support, a plurality of field magnets carried thereby in symmetrical arrangement to an axis, said magnets being electrically connected in pairs with the magnets of a pair located on a plane extending through such axis with the magnet pole pieces extending in the direction of such axis, a member interposed between opposing pole-pieces and spaced therefrom, said member forming a common element of the several magnetic circuits of the magnet pairs, a spindle supported on said axis and extending through said member, said spindle being operatively connected to the indicating element and carrying a ring-shaped element extending between the member and the several pole-pieces, and means for rendering said magnets active in a regular advancing progression.

17. An indicator comprising a support, a plurality of field magnets carried thereby in symmetrical arrangement relative to an axis and adapted to produce field-zones during magnet activity, an independent magnet structure carried by said support on said axis and adapted to provide an annular field spaced from said field zones, a spindle mounted on said axis and operatively connected to the indicating element, a ring-shaped element carried by said spindle and extending into said field zones and independent field, and means for rendering said magnets active in a regular advancing progression.

18. An indicator comprising a support, a plurality of field magnets carried thereby in symmetrical arrangement relative to an axis and adapted to produce field zones during magnet activity, an independent magnet structure carried by said support on said axis and adapted to provide an annular field spaced from such field zones, a spindle mounted on said axis and operatively connected to the indicating element, a ring-shaped element carried by said spindle and extending into said field zone and independent field, and means for rendering said magnets active in a regular advancing progression, said independent magnet structure being in the circuit of said field magnets and unaffected by changes in magnet activity, whereby the activity of the annular field will remain constant.

19. An indicator comprising a support, a plurality of field magnets carried thereby in symmetrical arrangement to an axis, a spindle supported on said axis and carrying a ring-shaped element within the field zones of the magnets, an indicator operatively connected to the spindle, means for regulating the reluctance of the magnetic circuits, and means for rendering said magnets active in a regular advancing progression.

20. An indicator comprising a support, a plurality of field magnets carried thereby in symmetrical arrangement to an axis, a spindle supported on said axis and carrying a ring-shaped element within the field zones of the magnets, an indicator operatively connected to the spindle, a member adjustable relative to such magnets for regulating the reluctance of the magnetic circuits, and means for rendering said magnets active in a regular advancing progression.

21. An indicator comprising a support, a plurality of field magnets carried thereby in symmetrical arrangement to an axis, said magnets being electrically connected in pairs with the magnets of a pair located on a plane extending through such axis with the magnet pole-pieces extending in the direction of such axis, a member interposed between opposing pole-pieces, and spaced therefrom, said member forming a common element of the several magnetic circuits of the magnet pairs, means for regulating the reluctance of the magnetic circuits, a spindle supported on said axis and extending through said member, said spindle being operatively connected to the indicating element and carrying a ring-shaped element extending between the member and the several pole-pieces, and means for rendering said magnets active in a regular advancing progression.

22. An indicator comprising a support, a plurality of field magnets carried thereby in symmetrical arrangement to an axis, said magnets being electrically connected in pairs with the magnets of a pair located on a plane extending through such axis with the magnet pole-pieces extending in the direction of such axis, a member interposed between opposing pole-pieces and spaced therefrom, said member forming a common element of the several magnetic circuits of the magnet pairs, a member adjustable relative to such magnets for regulating the reluctance of the magnetic circuits, a spindle supported on said axis and extending through said member, said spindle being operatively connected to the indicating element and carrying a ring-shaped element extending between the member and the several pole-pieces, and means for rendering said magnets active in a regular advancing progression.

In testimony whereof I have hereunto set my hand.

FRANK W. WOOD.